United States Patent [19]

Vollhardt

[11] Patent Number: 4,815,399
[45] Date of Patent: Mar. 28, 1989

[54] INCINERATOR CONSTRUCTION

[75] Inventor: Frohmut Vollhardt, Oberhausen, Fed. Rep. of Germany

[73] Assignee: MAN Gutehoffnungshütte GmbH, Fed. Rep. of Germany

[21] Appl. No.: 154,049

[22] Filed: Feb. 9, 1988

[30] Foreign Application Priority Data

Feb. 7, 1987 [DE] Fed. Rep. of Germany ....... 3703855

[51] Int. Cl.[4] .............................................. F23B 7/00
[52] U.S. Cl. ................................... 110/234; 110/246; 110/212; 122/2 R
[58] Field of Search ............... 110/246, 212, 226, 234; 122/7 R

[56] References Cited

U.S. PATENT DOCUMENTS 3,822,651  7/1974  Harris et al. ..................... 110/246 X
3,848,548 11/1974  Bolejack, Jr. et al. ......... 110/246 X
3,861,335  1/1975  Przwalski ........................ 110/246 X Primary Examiner—Edward G. Favors
Attorney, Agent, or Firm—McGlew and Tuttle

[57] ABSTRACT

An incinerator plant for waste materials having a large throughput capacity and/or partial-load operation comprises a combination of two rotary tube furnaces feeding into a common secondary combustion chamber provided with burners that can be selectively added in and turned off, and which in turn feeds gaseous products of combustion into a waste heat boiler having two boiler flues which are connected to a common steam drum. The plant requires only one monitoring system and, when provided with a rotary tube furnace and a furnace grate, can be used for the incineration of special refuse and household refuse simultaneously.

2 Claims, 3 Drawing Sheets

INCINERATOR CONSTRUCTION

FIELD AND BACKGROUND OF THE INVENTION

The invention relates in general to furnaces and in particular to a new and useful incinerator plant for waste materials, comprising a horizontal rotating combustion chamber, a vertical lined secondary combustion chamber, and a following waste heat boiler.

Plants for the incineration of waste materials, e.g. special refuse, are known. The waste brought in is supplied via charging and proportioning devices to a rotary tube furnace, in which the introduced materials are burned, depending on their type, at temperatures between 900° and 1300° C. At the end of the rotary tube furnace, the slag is discharged downwardly. For complete combustion the flue gases forming during combustion get into a secondary combustion chamber, in which they are held at a temperature between 900° and 1400° C. Downstream of the secondary chamber a waste heat boiler is mounted, to which the almost homogeneous gas mixture from the secondary combustion chamber is supplied at about 1400° C. Here the gases are cooled to about 300° C., and with the removed heat steam is produced. The slag and ash from the rotary tube furnace and the secondary combustion chamber are taken up by a wet slag remover disposed under the secondary combustion chamber. As a rule, an electrofilter and a wet scrubber complete the waste incinerator plant.

Industrial production, increasing due to the continually growing world population, naturally also creates increasing amounts of industrial waste. Carrying these waste materials to dumps is highly problematical, as this may contaminate the ground water. Besides, the volume of waste to be disposed of is usually so great that the dump area is insufficient. To dispose of these industrial waste materials without danger to the environment, plants for the incineration of the special refuse are set up in chemical plants, in communities, etc. By combustion of the wastes at a high temperature, the dangerous chemicals are transformed into flue gas and ash. The purified gases can then be emitted into the atmosphere without risk and the ash can be dumped without a problem.

There are necessarily limits to the erection of waste incinerator plants and to the development of installation of increasing size. Thus, the size in which rotary tube furnaces and waste heat boilers can be built is limited. The refractory lining and the deformability of the rotary tube jacket set limits as to the diameter and length of the furnace. For waste heat boilers, maintaining the cleaning of the boiler and the water circulation demand a limitation in size.

An incinerator plant of the described kind and of the state of the art has reached its maximum at a waste throughput of about 100,000 tons per year in 24-hour operation.

From "VGB Kraftwerkstechnik"64 (1984), p. 1015-1019, an industrial refuse elimination plant is known in which, to bring about as high as possible an availability of the entire plant, two thermal treatment lines working independently of each other were set up.

In German AS No. 23 27 795, a refuse incinerator plant is described where several incinerator furnaces are connected via closable flue gas lines to several steam generators. Named as prior art in this publication are a grate furnace for refuse incineration with secondary combustion chamber, heat exchanger and waste gas dust removal system as a separate unit. Further, reference is made to a refuse incinerator plant in which a waste heat boiler is arranged behind a rotary drum. According to German AS No. 23 27 795, cf. the patent figure, the two steam generators are followed by a common dust removal system for the flue gas and a smokestack. Further, it is stated that it is possible to correlate several incinerator furnaces to one steam generator.

SUMMARY OF THE INVENTION

The invention provides an incinerator plant having a throughput of more than 100,000 tons of waste materials per year in one unit with optimum efficiency.

Further it is to be possible to run such a plant also in partial-load operation. In addition, such a plant opens up the possibility to burn household refuse as well as special refuse simultaneously or to carry out the alternate combustion of these waste materials.

According to the invention, the incinerator plant includes a combination of two parallelly arranged singly operable rotary tube furnaces, a common secondary combustion chamber provided with concentrically arranged liquid fuel and gas burners that can be added in and turned off selectively, and of a waste heat boiler with two parallelly arranged singly operable boiler flues which are connected to a common steam drum, the plant having a common monitoring system.

The combination according to the invention makes it possible to provide a compact incinerator plant as a unit which at a high waste throughput capacity requires no higher operating and maintenance costs than a plant of less throughput capacity according to the previously described state of the art.

The new incinerator plant has the additional advantage that it can easily be switched to partial-load operation. Partial load can be run with the one existing monitoring system when operating one rotary tube furnace and one boiler section. The secondary combustion chamber is very versatile because of the possibility to add and to turn off burners.

Concerning maintenance of the waste heat boilers it should be mentioned also that cleaning the boilers present no problem with the boiler according to the invention because, based on the design, the individual boiler flues do not have larger dimensions than a waste heat boiler of the prior art.

According to a further feature of the invention, the incinerator plant can comprise a combination of a singly operable rotary tube furnace in parallel arrangement with a singly operable furnace grate, e.g. inclined grate, traveling grate or the like. In this case special refuse is charged into the rotary tube furnace and household refuse is charged into the furnace grate. In this respect the incinerator plant according to the invention is suitable in this alternative combination both for the combustion of chemical waste materials and household refuse. As is known, furnace grates are not suitable for the combustion of chemical residues because, for one thing, the temperatures attainable on the grates are not always sufficient and, for another, liquid or pastry residues flow off through the grate unburned. A rotary tube furnace in turn is less suitable for incinerating household refuse because its operation is uneconomical in particular for the often bulky and voluminous household refuse.

Thereby, operation of the combination of rotary tube furnace and the furnace grate for the simultaneous incineration of household refuse on both parallelly arranged incineration systems is not ruled out.

In the combined incinerator plant for special and household refuse, separate charging devices are, of course, necessary, but following the two parallelly arranged incineration devices there are, according to the invention, a common secondary combustion chamber, in which the flue gases of both furnaces are heated to at least 1200° C., and the two-flue waste heat boiler, the boiler flues of which can alternatively be operated singly.

This plant can, of course, be operated also so that always only the rotary furnace side or the furnace grate side is in operation.

Accordingly, it is an object of the invention to provide an incinerator which comprises a vertically elongated common secondary combustion chamber which has a lower inlet into which are connected two separate rotary tubular furnaces which have outer ends for the charging of the material and inner ends connected into the secondary combustion chamber and wherein the secondary combustion chamber has a plurality of burners for the selective burning of any desired fluid to maintain a proper incinerating temperature in the secondary combustion chamber and which further includes a waste heat boiler connected to the upper end of the secondary combustion chamber and which has two separate boiler flue gas passes with a common steam drum positioned to extend between the passes for heating by the flue gases which pass through these passes.

A further object of the invention is to provide an incinerator which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
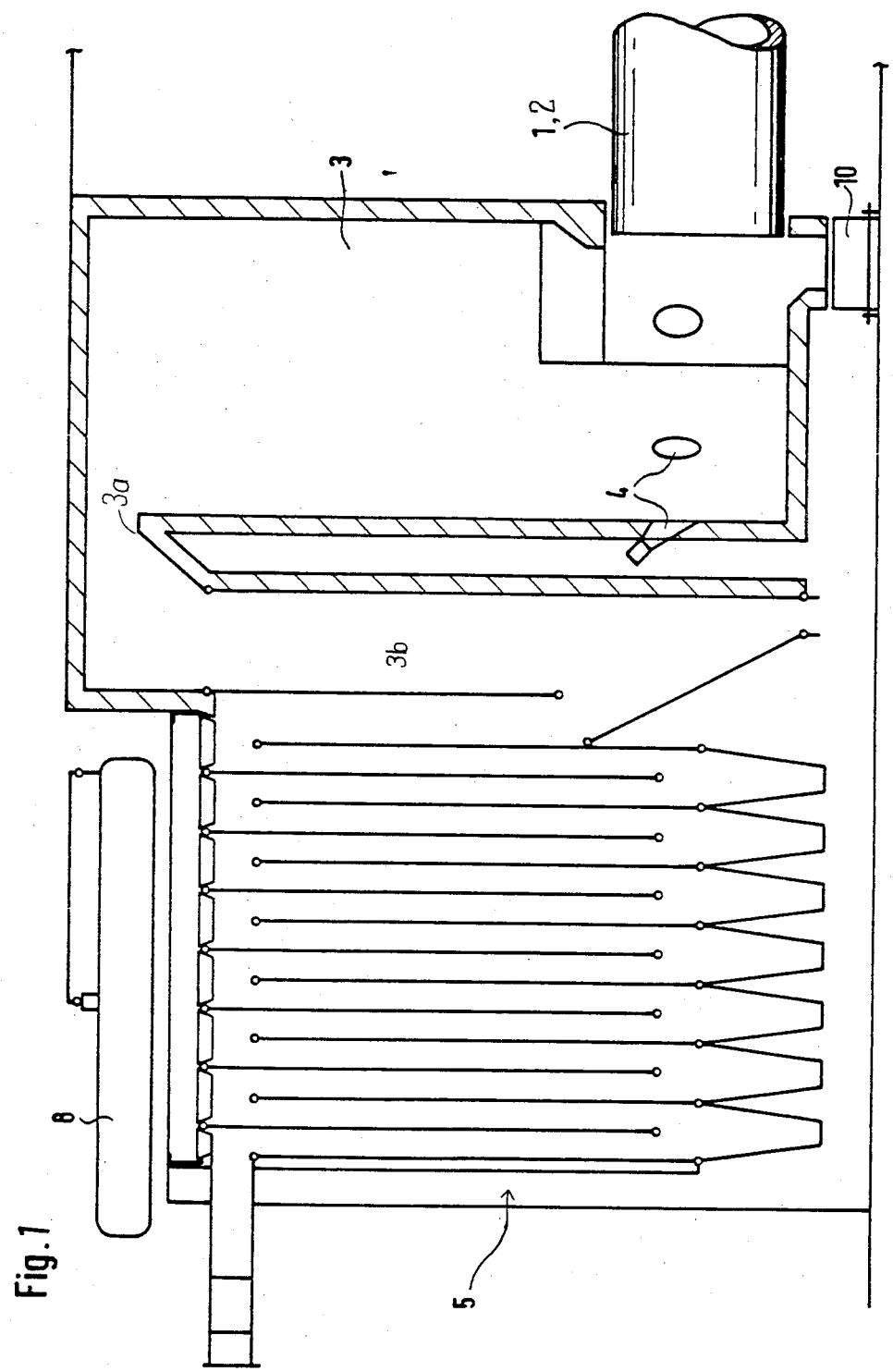
FIG. 1 is a schematic longitudinal sectional view of a waste incinerator plant with two rotary tube furnaces, constructed in accordance with the invention.

Referring to the drawings in particular, the invention embodied therein comprises a vertically elongated common secondary combustion chamber 3 which has a lower inlet end and an upper end with a combustion gas pass 3a. At least two furnaces 1 and 11 have outer ends for the charging of materials to be incinerated and inner ends which are connected into the secondary combustion chamber 3 adjacent the lower end thereof. In the embodiment shown in FIG. 2 the furnace designated 1 is a rotary tube furnace and the one designated 11 is includes a tubular element having a continuous rate 11 which feeds the material into the secondary combustion chamber 3.

A plurality of burners extend into the secondary combustion chamber 3 and aid in the combustion so as to maintain a proper incinerating temperature as desired.

In accordance with the invention a waste heat boiler which has separate substantially parallelly arranged boiler flue gas passes 6 and 7 are connected to the upper end of the secondary combustion chamber at the location of the combustion gas pass 3a. A feature of the construction of the waste heat boiler is that a steam drum 8 is positioned so as to extend between the boiler passes 6 and 7 for selective heating by whichever gas pass is being used.

FIG. 1 shows an incinerator plant for waste materials in a schematic diagram which contains only the plant portions relating to the invention, namely the rotary tube furnace 1.

Waste is supplied to at least two parallelly arranged rotary tube furnaces 1 and 2 via charging devices (not shown). At the outflow ends of the furnaces the burned slag is discharged downwardly or to one side and drops through the slag remover 10.

The flue gases forming during incineration in the rotary tube furnaces and 2 are conveyed for complete burnout to a vertical, lined secondary combustion chamber 3 which, in the embodiment example, is of circular cross section. A plurality of liquid fuel and/or gas burners 4 are arranged concentrically in the lower region of the secondary combustion chamber at the circumference. The burners are to ensure that the flue gas are heated to a minimum temperature of 1200° C., so that all harmful substances are burned up.

In both embodiments, the as mixture passes from the secondary combustion chamber 3 through a horizontal combustion gas 3a and a vertical downpass 3b, into a waste heat boiler 5, which comprises two boiler flues 6 and 7. The space between the boiler flues 6 and 7 contains stages 9, which can be walked on for the purpose of boiler maintenance (cleaning etc.). In addition, the control station for the incinerator plant may be accommodated in this interspace. The control station and the monitoring system for the plant are otherwise not illustrated in the patent figures.

Above and below the stages 9, the space 20 between the boiler flues 6 and 7 is utilized for ascending and descending lines 12 of the waste heat boiler 5

Above the boiler flues 6 and 7, there is an upper pass 22 having a steam drum 8 common to each flue. Illustration of an electrofilter and a wet scrubber following the waste heat boiler 5 was dispensed with.

Figure 2:
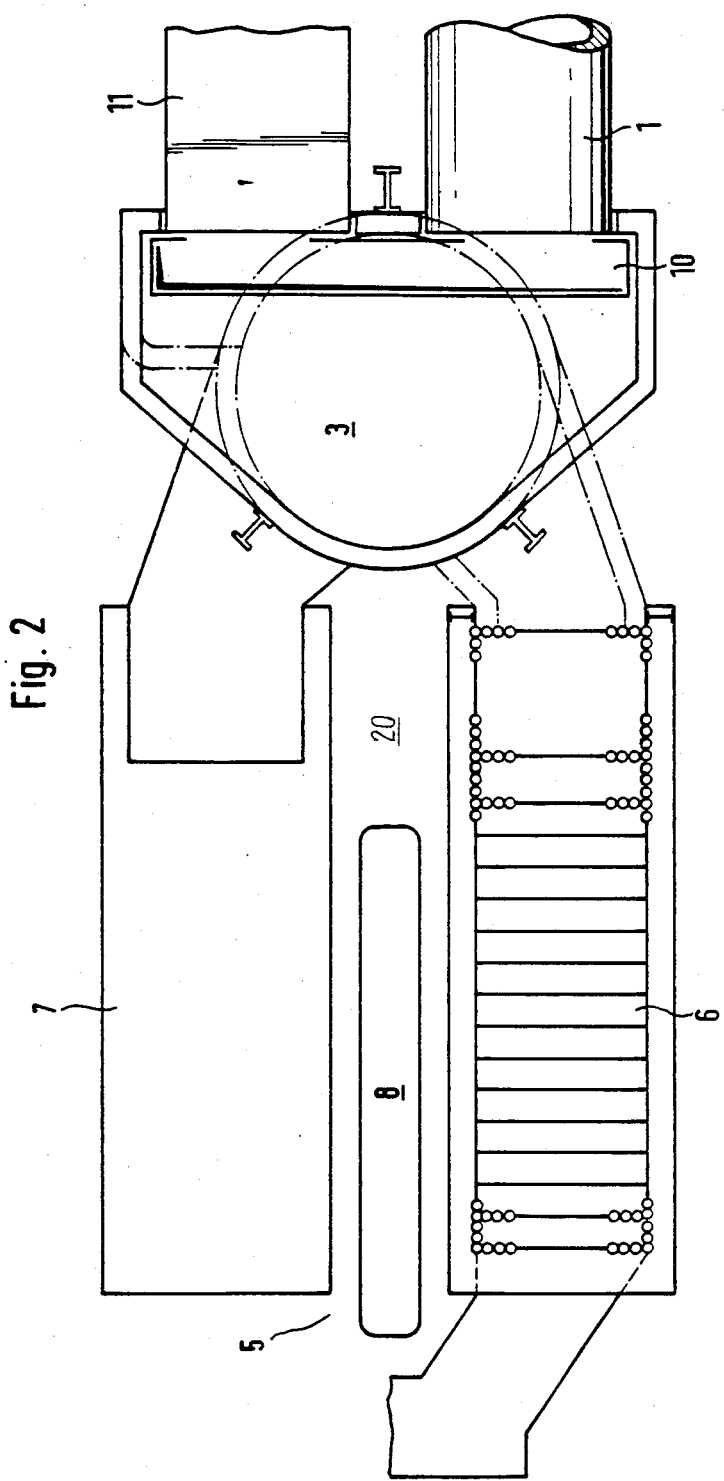
FIG. 2 is a top plan view of the waste incinerator plant of an embodiment with one rotary tube furnace and one furnace grate.
Figure 3:
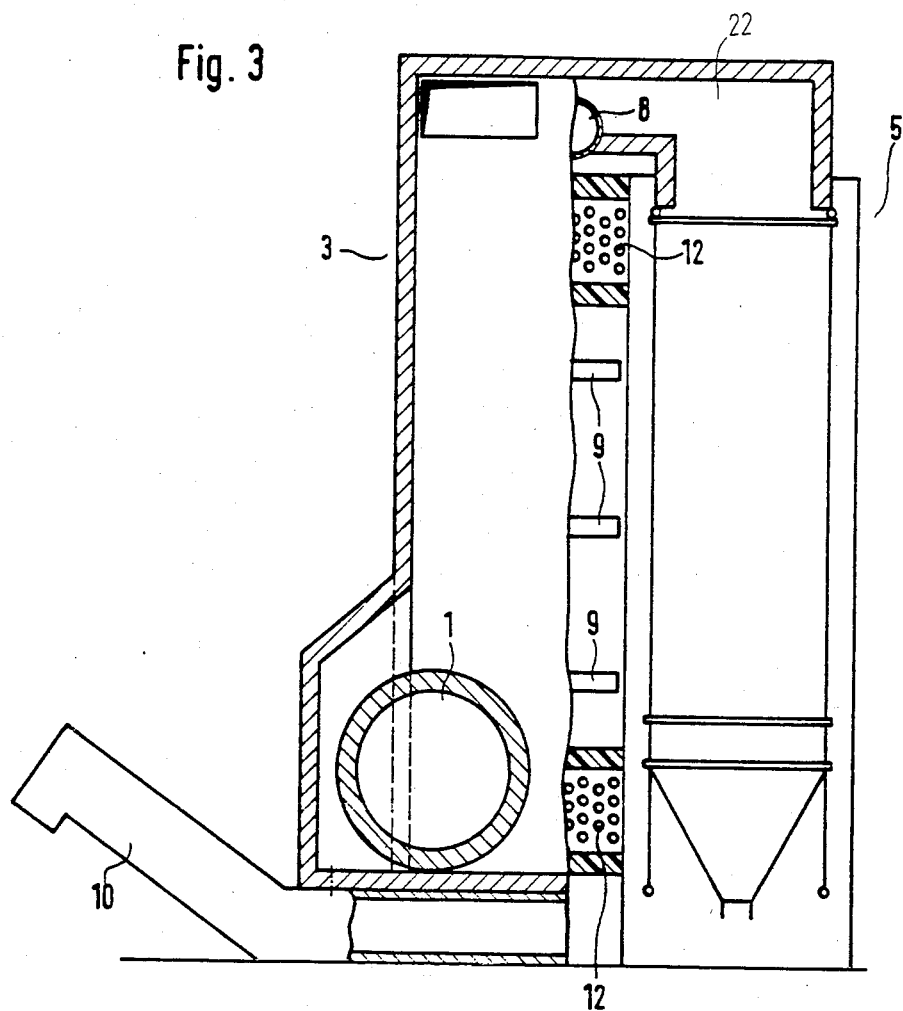
FIG. 3 is a transverse sectional view of the secondary combustion chamber and of the waste heat boiler according to FIG. 1.

In FIG. 2, a furnace grate 11 is indicated in the place of the second rotary tube furnace 2. A waste incinerator plant in this furnace combination—rotary tube and in parallel arrangement a furnace grate—can be used for incinerating, for example, chemical residues (special refuse) and household refuse simultaneously. The chemical residues are then charged into the rotary tube furnace 1, while the household refuse is placed on the furnace grate 11. The secondary combustion chamber 3 with the slag remover 10 and the two-flue waste heat boiler 5 with steam drum 8 follow as described above.

While specific embodiments of the invention have been shown and described in detail to illustrate the application of the principles of the invention, it will be understood that the invention may be embodied otherwise without departing from such principles.

What is claimed is:

1. An incinerator, comprising a vertically elongated common secondary combustion chamber portion having a lower inlet end and an upper end with a combustion gas pass extending outwardly therefrom adjacent said upper end, at least two tubular furnaces having outer ends for the charging of materials to be incinerated in inner ends connected into said secondary combustion chamber, at least one of said furnaces being rotatable, a plurality of burners extending into said secondary combustion chamber for aiding in the combustion in said secondary combustion chamber, and a waste heat boiler connected into said combustion gas pass having two substantially parallel arranged selectively and singly operable boiler flue gas passes, and a common steam drum positioned to extend between said boiler flue gas passes for heating by the flue gas passes passing therethrough.

2. An incinerator according to claim 1, wherein said at least two tubular furnaces includes a horizontally arranged rotating combustion chamber which may be operated alone and at least one furnace having an operable furnace grate, said burners being concentrically arranged and including at least some liquid fuel burners and some gas burners which are selectively operable.

* * * * *